United States Patent [19]

Botes

[11] 3,917,818

[45] Nov. 4, 1975

[54] TREATMENT OF MASTITIS IN COWS, THE PRODUCT FOR THIS TREATMENT AND TO THE PRODUCTION OF SAID PRODUCT

[75] Inventor: Hendrik Jacobus Weideman Botes, Kameeldrift, South Africa

[73] Assignee: Agricura Laboratoria Limited, Silverton, South Africa

[22] Filed: Nov. 9, 1972

[21] Appl. No.: 305,048

Related U.S. Application Data

[63] Continuation of Ser. No. 2,974, Jan. 14, 1970, abandoned.

[52] U.S. Cl. ................................................. 424/87
[51] Int. Cl.² ........................................ A61K 39/40
[58] Field of Search ..................................... 424/87

[56] References Cited

UNITED STATES PATENTS 3,203,865   8/1965   Koehler et al. ...................... 424/87

*Primary Examiner*—Norman A. Drezin
*Attorney, Agent, or Firm*—Shoemaker and Mattare

[57] ABSTRACT

The invention relates to the method of treatment of mastitis, preparation of the product for use in the treatment and the product itself. The mastitis is confined to that occurring in cows, ewes and goat does and is treated by intra-mammary infusion of immuno-globulin which is gamma-globulin to which anti-bodies are attached. The immuno-globulin is obtained from the pooled blood of cows suffering from the disease.

10 Claims, No Drawings

TREATMENT OF MASTITIS IN COWS, THE PRODUCT FOR THIS TREATMENT AND TO THE PRODUCTION OF SAID PRODUCT

This application is a continuation application of Ser. No. 2,974, filed Jan. 14, 1970, now abandoned.

This invention relates to the treatment of cows, sheep ewes and goat does either therapeutically or prophylactically against mastitis as well as the product which is used in the treatment and to the production of this product.

Mastitis is one of the most important erosion diseases found in cows. Apart from the heavy losses which the milk farmer and consequently the dairy industry suffers as a result of damaged udders and lower milk production, the use of infected milk is a serious public health problem.

It is therefore not surprising that mastitis today, as over the past 10 to 15 years, enjoys the intensive attention of researchers throughout the world. In fact, there is a progressive increase in the incidence and degree of the infectious disease-complex, even though antibiotic remedies are used in large quantities and preventative precautions, such as hygiene and the use of vaccines, are taken.

Active immunity by way of systematic vaccination of the cow with a vaccine is of little value. Vaccines can produce circulating antibodies in the blood. However, the serums agglutinin or precipitin in the blood cannot enter or be taken up by the udder and are thus of no value in preventing mastitis.

Antibiotics are only valuable as additives and alone are incapable of controlling mastitis because of various shortcomings.

Narrow-spectrum antibiotics, for example, penicillin, are today of minor value because their action is confined to a certain group of organisms, for example sensitive, grampositive organisms, while mastitis is a complex infection. This applies to Penicillin G, the semi-synthetic Penicillin as well as other narrow-spectrum antibiotics.

The available wide-spectrum antibiotic remedies or combinations of the narrow-spectrum antibiotics are not always effective and are also too expensive to be used as a standard control measure. Not all wide-spectrum antibiotics can be mixed because their action is antagonistic while others are not suitable for intra-udder administration.

The injudicious and continuous use of antibiotic remedies has resulted in supra-infections as well as the development of resistant organisms which were previously sensitive. This applies to both the narrow-spectrum and wide-spectrum antibiotic remedies.

In addition the excretion of antibiotics in milk is a serious public health problem.

The problem of mastitis also occurs in other animals, particularly sheep ewes and goat does and, where applicable, the term "cows" as used in this specification and claims is to be interpreted as including such sheep ewes and goat does.

It is the object of the present invention to provide products which may be economically prepared and a method of treatment of mastitis in cows which is definitely effective.

According to this invention there is provided the antibody product mastitis immuno-globulin.

It is to be understood that the use of the term "immuno-globulin" in this specification means gamma-globulin to which is attached immune bodies.

The invention also provides a method of preparing mastitis immuno-globulin comprising the preparation of the gamma-globulin from the blood of a cow suffering from chronic mastitis.

A further feature of this invention provides for the blood from which the immuno-globulin is obtained to be pooled from a number of cows to give a polyvalent product.

The method of treating mastitis in cows according to this invention comprises the intra-mammary introduction of gamma-globulins into cows.

A still further feature of this invention provides for the treatment to include the use of immuno-globulin and for this immuno-globulin to be used in conjunction with one or more other antimicrobial agents.

This aspect of the invention will best be illustrated by means of an example. Where the udder of a cow is infected by, for example, a specific grampositive organism which causes mastitis, the organism may effectively be treated in any one of several ways. An immuno-globulin may be used which contains the antibody to that specific grampositive organism or organisms. If the concentration of the specific antibody in the immuno-globulin is high enough to be pharmacologically effective, the immuno-globulin may be used alone without any additives. An alternative treatment would be using an immuno-globulin that does not contain antibodies generally effective against mastitis-causing organisms. In this case it will be necessary to use the immuno-globulin in conjunction with an antibiotic or chemo-therapeutic agent that is effective against the mastitis-causing organism when the latter is in a non-resistant state.

For example, in the case of a cow that is infected with mastitis and has been treated with an antimicrobial agent for example, with little or no effect, the cow may be treated with immuno-globulin in conjunction with that or another chemo-therapeutic agent.

The use of gamma-globulin in place of immuno-globulin and in the above manner has also been found to be effective under some conditions but the immuno-globulin is more effective.

A series of experiments that have been conducted on cows that were infected with mastitis indicates that the gamma- and immuno-globulins increase the sensitivity of the organisms to the action of the antimicrobial agent. The result is that if an organism has built up a resistance to the drug, on administration of the drug in conjunction with gamma- or a non-specific immuno-globulin, the gamma- or immuno-globulin is thought to break down the resistance of the organism to that drug which will in turn be effective against that organism to enhance the therapeutic effect of the gamma- or immuno-globulin. Generally the gamma- or immuno-globulin will be used with a preservative, a diluent, and mixed with an antimicrobial agent as referred to above.

The manner in which the globulins described are obtained is set out below:

The blood serum of normal animals contains a large quantity of protein, inter alia, albumin and globulin. The globulin consists of different components including the gamma-globulin to which antibodies, when present, are coupled.

Antibodies may develop in the body of an animal if that animal should become infected. Antibodies may also develop if the animal is vaccinated with a vaccine derived from the organism causing the specific disease condition or when such an animal is continuously suitably injected at short intervals with large doses of the specific infectious organism. The latter condition will generally result in a hyper-immune state. The serum obtainable from a hyper-immune animal is of great therapeutic value and is also used for establishing passive immunity. This serum can be used for the production of immuno-globulin.

Hyper-immune serum is universally produced by artificial immunisation of animals by repeated injections of a specific bacterin or its toxoid at short intervals using increasingly higher doses. The interval between injections varies from 4 – 14 days and a minimum of 4 – 8 injections is usually required. Either the subcutaneous, intramuscular or intravenous routes or combinations thereof are used.

A blood sample is taken 8 to 14 days after the last injection and the serum tested for the presence of specific agglutinating antibodies and their levels. If unsatisfactory, the whole process of hyper-immunisation is repeated. In order to stimulate the production of higher levels of agglutinating antibody, adjuvants are used (for example Freund's complete or incomplete adjuvants). With the aid of adjuvants the agglutinating, but not necessarily the immunising antibodies, could be increased up to 10 times.

If the agglutinating titre is satisfactory the animal is bled, sterilely.

The main disadvantages of artificial hyper-immunisation are:

a. Only one type of organism (serotype or variant) or one toxoid is used per animal; A monovalent homologous hyper-immune serum is therefore generally produced in one animal.

In the case for example of *staphylococcus aureus*, one of the many causes of mastitis, there are a few hundred serotypes and more than 80 phagetypes known.

In order to produce a polyvalent hyper-immune serum against one group of homologous organisms (e.g. *Staph. aureus*) at least 20–30 animals should be used and at least 100 animals for the production of a polyvalent hyper-immune serum against the majority of heterologous bacteria.

b. Killed cultures or toxoids are used in order to prevent death in the animals to be hyper-immunised. By killing the pathogenic bacteria, large portions of the natural virulent factors, of which little is known to date, are destroyed resulting in the production of incomplete antibodies. The same applies to toxoids.

c. The response to artificial immunisation varies from animal to animal;

d. In artificial hyper-immunisation a large number of animals as a rule die of shock, especially during the later stages of immunisation, on account of the large doses used.

These disadvantages are to a large extent ruled out by pooling the blood of a large number of animals from different areas, suffering from the chronic form of mastitis. Such pooled hyper-immune serum contains complete natural antibodies against heterologous groups of bacteria as well as the heterologous types within a group responsible for the various forms of the disease.

(It has been found that the pooled blood of abattoir slaughtered animals can be a satisfactory source of pooled blood of naturally infected animals).

(The superior value of polyvalent heterologous hyper-immune serum derived from pooled blood of animals suffering from chronic mastitis above that of a single animal has been established in Applicant's laboratory).

The heterologous hyper-immune serum from which the desired immuno-globulin is to be obtained may be conveniently produced from the pooled blood in the manner set out below.

Contrary to the horse, the blood from bovines, when allowed to clot naturally, produces very little serum (10 to 20%) and haemolyses very easily. To overcome these problems the pooled blood is collected in sodium citrate (anticoagulent) and dextrose (antihaemolytic) at a final concentration of 0.5% each. The plasma is separated from the blood cells by centrifuging. This will ensure at least 60% plasma. From the plasma the serum is obtained by adding $CaCl_2$ at a concentration of 3.75 g/litre to the plasma resulting in the formation of a gel. The gel is cut up in small portions and strained through a cheese-cloth to separate the clotted fibrin and fibrinogen from the serum. The serum yield is ± 50 percent of the original volume blood used.

The serum is then tested for the presence of specific agglutinins using 40 representative bacterial isolates. These include: *Staph. aureus, Strept. agalactiae, Klebsiella pneumoniae, Pseudomonas aeruginosa, E. coli* and *Salmonella*. Satisfactory serum is then used to produce the immuno-globulin.

The gamma-globulin to which the antibodies are attached is precipitated from the serum with $(NH_4)_2SO_4$, by slowly dripping a 50 percent $(NH_4)_2SO_4$-solution into an equal volume of serum. This will give a final concentration of 25 percent $(NH_4)_2SO_4$. The $(NH_4)_2SO_4$ gamma-globulin precipitate is recovered by filtration, transferred to special cellulose casing and dialysed against cold, running water to remove the $(NH_4)_2SO_4$. Dialysing lasts for 6–8 days after which time the dialysate is tested with 2 percent $BaCl_2$ for the presence of $(NH_4)_2SO_4$. The $(NH_4)_2SO_4$-free concentrated immuno-globulin is centrifuged at 1500 r.p.m. to remove large molecule protein impurities and sterilized by filtration.

Standardisation is achieved by the Applicant by the following methods:

a. Immuno-electrophoresis for determining the gamma-globulin concentration;
b. determination of the total protein concentration;
c. growth-inhibition test;
d. agglutinating antibody titre;
e. sterility test;
f. safety test.

Depending on (a), (b), (c) and (d), the concentrated product is diluted in a phosphate-buffer saline solution to final concentration required. This concentration is 10–12 percent protein, more than 90 percent gamma-globulin, a minimum of 1:6400 agglutinins and an in vitro growth-inhibition concentration of 1:10 dilution per ml. The recommended dose is: 20 ml of the final product per quarter of a cow producing less than 3 gallons per day and 40 ml for higher producing animals.

Sterility tests are done on blood agar plates and the safety of the products tested by injecting double the recommended dose into a young calf or into one quarter of a normal udder.

The product will preferably be marketed in a freeze-dried form, with a diluent (water) containing 0.25 percent phenol as a preservative only for the preventative treatment of mastitis, and with 0.25 percent phenol plus 200,000 I.U. Penicillin G and 250 mg Dihydrostreptomycin per dose for the treatment of clinical mastitis.

The treatment of mastitis in a cow may be either therapeutical or prophylactic. The product is administered by infusion into the udder through the teat canal.

formed was broken up and suspended on mutton cloth for the serum to drip out and be collected. Ammonium sulphate was then used to precipitate the serum. Sample precipitation was effected using different amounts of ammonium sulphate and the protein precipitate was analysed by electrophoresis. The results were as follows:

| % of $(NH_4)_2SO_4$ Calculated on serum volume | Total Protein (gm.) | Albumin | | $\alpha$—II globulin | | $\alpha$— globulin | |
|---|---|---|---|---|---|---|---|
| | | (gm) | % Total | (gm) | % Total | (gm) | % Total |
| 30% | 8.6 | 0.64 | 7.8 | 1.56 | 18.1 | 6.40 | 74.1 |
| 25% | 9.5 | 0.24 | 2.5 | 1.46 | 15.4 | 7.80 | 82.1 |
| 20% | 10.6 | 0.23 | 2.2 | 0.72 | 6.8 | 9.62 | 91.0 |

The results of one test using mastitis immuno-globulin will now be given. In this one test three infected cows were treated with three different antibiotics. No improvement was noticed. The cows were then treated with a combination of mastitis immuno-globulin. A response was noticed within 3 days and all the cows were completely cured after 10 days.

(The results obtained by the Applicant show that the treatment results in at least a limited period of passive immunity to mastitis. Further the artificial or natural infection of a cow during such a period of passive immunity acts as a booster indicating a resultant active immunity).

More particularised examples are given below for a fuller understanding of the invention.

EXAMPLE 1

Isolation of the Antibody

A total of 20 litres of blood was collected from a number of cows suffering from different types of chronic mastitis. 170 mls of a 50 percent solution of sodium citrate in 50 percent aqueous dextrose were added. The mixture was transported to the laboratory and centrifuged in a continuous type of centrifuge at 3000 r.p.m. for 30 minutes to separate the red blood cells from the plasma.

The plasma was treated with 3.75 grams of calcium chloride per litre to coagulate it. The coagulate gel 25 grams of ammonium sulphate per 100 mls of serum were used for the bulk precipitation of the $\alpha$ globulin which was centrifuged off 8 hours later, placed into sacs of regenerated cellulose foil and dialysed at 4°C with running tap water for 5–7 days, and then with 0.8 percent aqueous NaCl solution for 2 days. In this way, the ammonium sulphate was removed. The resultant product was concentrated to 15–16 percent solids filtered and then standardised by agglutination and growth inhibition tests with different degrees of dilution of the product.

This method of testing is well known, and in Applicant's experiments 1 ml of the product in a first tube containing 199 ml water; 1 ml of this solution in a second tube containing 199 ml water; 1 ml of this solution in a third tube containing 199 ml of water and so on, were used, using 13 tubes.

The result of the agglutination tests are given in Table I. In this table the dilution refers to the number of parts of water containing 1 part of the product.

Also + means agglutination
and N means no agglutination.

Agglutination tests for the serum before precipitation, the immuno-globulin (50 percent concentrated) and fully concentrated are shown in Table II.

It will be understood that such a product is of a polyvalent nature as can be seen from the tables.

TABLE I

| MICRO-ORGANISM | 50 | 100 | 200 | 400 | 800 | 1600 | 3200 | 6400 | 12800 | 25600 | 51200 | 102400 | Control |
|---|---|---|---|---|---|---|---|---|---|---|---|---|---|
| E.coli | 2+ | 2+ | 2+ | 2+ | 2+ | N | N | N | N | N | N | N | N |
| Staph. Aureus | 3+ | 3+ | 2+ | 2+ | 2+ | + | N | N | N | N | N | N | N |
| E. coli +Bacillus sp. | 3+ | 2+ | 2+ | 2+ | 2+ | 2+ | 2+ | 2+ | 2+ | 2+ | 2+ | 2+ | N |
| | 3+ | 3+ | 2+ | 2+ | 2+ | N | N | N | N | N | N | N | N |
| E. coli | 4+ | 3+ | 3+ | 3+ | 3+ | 2+ | + | N | N | N | N | N | N |
| Staph. Aureus —C Bacillus | 3+ | 3+ | 2+ | N | N | N | N | N | N | N | N | N | N |
| | 3+ | 3+ | 3+ | 2+ | 2+ | + | + | N | N | N | N | N | N |
| Staph. aureus | 3+ | 3+ | 2+ | 2+ | + | + | N | N | N | N | N | N | N |
| " | 4+ | 4+ | 4+ | 4+ | 2+ | 2+ | 2+ | + | + | + | N | N | N |
| Staph. Epidermidis | 3+ | 3+ | 3+ | 2+ | 2+ | N | N | N | N | N | N | N | N |
| Staph. aureus | 4+ | 4+ | 4+ | 3+ | 3+ | 2+ | + | + | + | N | N | N | N |
| Strept. Agalactiae | 3+ | 3+ | 3+ | 3+ | 3+ | 2+ | 2+ | + | + | N | N | N | N |
| Staph. Epidermidis | 3+ | 3+ | 3+ | 3+ | 2+ | 2+ | 2+ | 2+ | 2+ | N | N | N | N |
| Pseudomonas | 4+ | 4+ | 4+ | 4+ | 3+ | 3+ | 2+ | + | N | N | N | N | N |
| Staph. | | | | | | | | | | | | | |

TABLE I-continued

| MICRO-ORGANISM | 50 | 100 | 200 | 400 | 800 | 1600 | 3200 | 6400 | 12800 | 25600 | 51200 | 102400 | Control |
|---|---|---|---|---|---|---|---|---|---|---|---|---|---|
| aureus | 3+ | 3+ | 3+ | 3+ | + | + | + | + | N | N | N | N | N |
| " | 4+ | 4+ | 4+ | 3+ | 3+ | 3+ | 2+ | 2+ | 2+ | 2+ | 2+ | + | N |
| " | 3+ | 3+ | 3+ | 3+ | 2+ | 2+ | 2+ | + | N | N | N | N | N |
| " | 3+ | 3+ | 3+ | 3+ | 3+ | 3+ | 2+ | 2+ | 2+ | N | N | N | N |
| Staph. Epidermidis | 3+ | + | + | + | + | + | N | N | N | N | N | N | N |
| " | 3+ | 3+ | 3+ | 2+ | + | + | + | + | + | N | N | N | N |
| Streptococcus | 3+ | 3+ | 3+ | 2+ | 2+ | + | + | N | N | N | N | N | N |
| Staph. aureus | 3+ | 2+ | 2+ | 2+ | + | + | N | N | N | N | N | N | N |
| " | 3+ | 3+ | 3+ | 3+ | N | N | N | N | N | N | N | N | N |
| Staph. Epidermidis | 3+ | 3+ | 3+ | 3+ | 2+ | 2+ | + | + | + | N | N | N | N |
| " | 3+ | 3+ | + | + | N | N | N | N | N | N | N | N | N |

TABLE II

| MICRO-ORGANISM | AGGLUTINATION | | |
|---|---|---|---|
| | Serum before Precipitation | Product 50% Concentrated | Concentrated Product |
| —Bacillus | 200 | 800 | 1,600 |
| Streptococcus | 400 | 6400 | 51,200 |
| Staph. aureus | 3200 | 102400 | 102,400 |
| Staph. aureus | 3200 | 25600 | 12,800 |
| Staph. aureus | 3200 | 6400 | 25,600 |
| E.coli | 6400 | 6400 | 12,800 |
| E.coli | 200 | 800 | 1,600 |
| + Bacillus | 6400 | 12800 | 3,200 |
| + Bacillus | 6400 | 3200 | 12,800 |
| Staph. Epidermidis | 400 | 100 | 800 |
| Staph. Epidermidis | 1600 | 200 | 6,400 |
| Staph. aureus | 3200 | 200 | 400 |
| Staph. aureus | 1600 | 400 | 800 |
| Klebsiella | 3200 | 3200 | 25,600 |
| Staph. aureus | 1600 | 800 | 1,600 |
| Staph. aureus | 3200 | 400 | 6,400 |
| Staph. epidermidis | 25600 | 400 | 102,400 |
| Staph. epidermidis | 12800 | 6400 | 102,400 |
| Staph. aureus | 3200 | 800 | 25,600 |
| Staph. aureus | 25600 | 800 | 102,400 |
| Pseudomonas | 25600 | 6400 | 51,200 |
| Streptococcus | 25600 | 12800 | 102,400 |
| Staph. aureus | 25600 | 800 | 51,200 |
| Staph. epidermidis | 12800 | 1600 | 25,600 |

EXAMPLE 2

The anti-bacterial activity of the product of Example 1 is shown in Table III. The micro-organisms used are the standard micro-organisms which are responsible for about 90 percent of all cases of mastitis.

In this table:

Heading (1) means growth visible in tube;

Heading (2) means growth only visible on blood agar plates;

+ and N have the same meanings as in Table I;

Ig stands for immuno-globulin;

P stands for Penicillin G at a concentration of 5 gamma per mil;

S stands for dihydrostreptomycin at a concentration of 125 gamma per mil.

It is seen that the immuno-globulin is bacteriostatic, and that when mixed with penicillin and dihydrostreptomycin, an increased bactericidal effect is obtained compared with when these two antibiotics are present together but without the immuno-globulin.

TABLE III

| MICRO ORGANISM IDENTIFICATION | Number of Organisms per ml added. | IMMUNO GLOBULIN IN SERUM | | | | | | IMMUNO +Penicillin Dihydrostreptomycin in serum | | Penicillin Dihydrostreptomycin | | Control serum only | |
|---|---|---|---|---|---|---|---|---|---|---|---|---|---|
| | | 1% | | 5% | | 10% | | 10% IG +5 u P/125 S | | | | | |
| | | 1 | 2 | 1 | 2 | 1 | 2 | 1 | 2 | 1 | 2 | 1 | 2 |
| Staph. aureus | 150 | + | | N | N | N | + | N | N | + | | 2+ | |
| Staph. epidermidis | 580 | + | | N | + | N | + | N | N | N | + | 2+ | |
| " | 123 | + | | N | N | + | | N | + | 3+ | | 2+ | |
| Streptococcus | 700 | + | | + | | + | | N | N | N | N | 2+ | |
| Staph. epidermidis | 240 | 2+ | | N | + | N | + | N | N | N | N | 2+ | |
| " | 30 | 2+ | | N | N | + | | N | N | 2+ | | + | |
| " | 60 | 2+ | | N | N | + | | N | N | + | | 2+ | |

TABLE III-continued

| MICRO ORGANISM IDENTIFICATION | Number of Organisms per ml added | IMMUNO GLOBULIN IN SERUM 1% | | 5% | | 10% | | IMMUNO +Penicillin Dihydrostreptomycin in serum 10% IG +5 u P/125 S | | Penicillin Dihydrostreptomycin | | Control serum only | |
|---|---|---|---|---|---|---|---|---|---|---|---|---|---|
| | | 1 | 2 | 1 | 2 | 1 | 2 | 1 | 2 | 1 | 2 | 1 | 2 |
| Staph. aureus | 520 | 2+ | | N | N | 2+ | | N | N | 3+ | | 3+ | |
| " | 270 | 2+ | | N | N | N | + | N | + | N | + | 3+ | |
| " | 320 | 2+ | | + | | 3+ | | N | N | N | + | 2° | |
| " | 2250 | 3+ | | N | + | 2+ | | N | + | 2+ | | 4+ | |
| +Bacillus Sp. | 1000 | 2+ | | 2+ | | 2+ | | 2+ | | 3+ | | 3+ | |
| Pseudomonas | 1500 | + | | 2+ | | 2+ | | 2+ | | 2+ | | 3+ | |
| Staph. aureus | 800 | 2+ | | N | + | N | + | N | N | N | N | 2+ | |
| E.coli | 280 | N | | 2+ | | 2+ | | + | | + | | 2+ | |
| Staph. aureus | 200 | 2+ | | + | | N | + | N | N | N | N | + | |
| " | 300 | + | | + | | + | | N | + | 2+ | | 3+ | |
| " | 114 | 3+ | | N | + | N | + | N | N | 3+ | | 4+ | |
| E.coli | 1000 | 2+ | | 3+ | | 3+ | | 2+ | | 2+ | | 3+ | |
| Staph. aureus | 2190 | 2+ | | N | N | 2+ | | N | N | 3+ | | 3+ | |
| E.coli | 1000 | 3+ | | 2+ | | 2+ | | + | | + | | 2+ | |
| Staph. aurues —C Bacillus | 2500 | 3+ | | 3+ | | 3+ | | N | N | N | N | 3+ | |
| | 390 | 3+ | | 3+ | | 3+ | | 2+ | | 2+ | | 3+ | |
| Staph. aureus | 2500 | 3+ | | 3+ | | 3+ | | + | | + | | 3+ | |
| " | 1850 | N | | 3+ | | 3+ | | N | | N | + | 3+ | |
| Staph. epidermidis | 1000 | 2+ | | N | + | N | + | N | N | N | N | 3+ | |
| Streptococcus | 400 | 2+ | | 2+ | | 3+ | | N | N | N | N | 2+ | |

EXAMPLE 3

The freeze-dried product of Example 1 can be stored in bottles. To prepare a composition for application the product may be mixed with 25 ml of sterile water and 0.25 percent of phenol (as a preservative) 200,000 International Units of Penicillin G and 250 mg. of dihydrostreptomycin sulphate.

Advisably, the immuno-globulin is present as the pure concentrated polyvalent product, preferably with more than 80 percent of α-globulin, 15.5 percent (g/v) protein solids, minimum agglutinin values at 1:6400 and, minimum growth concentration against various *Staphylococci, Streptococci, E. coli, Klebsiella, Aerobacter* and *Pseudomonas* micro-organisms of 1:100.

A similar composition to that mentioned above, but without the antibiotics, can be used for passive immunity against bovine mastitis and has the advantage that an antibiotic is not being infused into the animal.

The compositions preferably are stored in a refrigerator at 4°C, and may be used for intra-mammary infusion through the teat canal for treatment of and passive immunity against bovine mastitis.

Generally 10–50 ml can be infused per quarter of an udder, generally to give at least 6–8 weeks protection.

It is recommended that the milk obtained from a treated quarter or quarters treated with immuno-globulin plus an antibiotic be discarded for 24 hours after treatment. Where no antibiotic is used the milk need not be discarded.

If mastitis is to be treated, it is recommended that a sample of the infected milk be analysed in a laboratory to ascertain which microorganism (for example gram-positive or gram-negative and a yeast or fungus) is causing the mastitis. Then an appropriate antibiotic or anti-fungal compound can be added to the immuno globulin before infusion.

EXAMPLE 4

The results for cows treated for mastitis are shown in Tables IV, V, VI, VII, VIII, IX and X.

In these tables:

Quarter means quarter of an udder (RF, RH, LF, LH standing for right front, right hind, left front and left hind, respectively;

Prod. stands for the milk production per day;

CMT stands for the California Mastitis Test;

Cl is the chloride content of the milk;

Pol. stands for Polyhorphonucleur Leucocytes/Mil;

Mon. stands for Mononucleur Leucocytes/Mil;

Tot. stands for total number of Leucocytes;

Tot/Ml stands for total number of bacterial isolates.

TABLE IV

Chronic Mastitis - Mixed Infection
Before Treatment

| Quarter | Clinical | Prod | CMT | pH | Cl | Cells/ml(10³) | | | Isolate Identification/ML |
|---|---|---|---|---|---|---|---|---|---|
| | | | | | | Pol | Mon | Tot | |
| RF | Hard-Intersticial Oedema (Fibrosis) | (lb) | 4+ | 6.80 | 142.00 | 950 | 450 | 1400 | 1. Staph. aureus/200<br>2. Gram + Bacillus/ > 2000 |
| RH | Normal | | — | 6.70 | 92.80 | 250 | 200 | 450 | Staph. epidermidis/200 |
| LF | Hard-Intersticial Oedema (Fibrosis) | 25 | 4+ | 6.75 | 127.80 | 1350 | 500 | 1850 | 1. Staph. aureus/190.<br>2. Strept. agalactiae/2000 |
| LH | Normal | | — | 6.60 | 78.10 | 150 | 150 | 300 | Staph. epidermidis/80 |

TABLE IV(a)

Before treatment with Immunoglobulin.
10 days after treatment of RF and LF with Immuno Globulin (2 doses at 12 hr. intervals), plus 0.25% Phenol, 200,000 I.U. Penicillin G and 250 mg Dihydrostreptomycin per dose.

| Quarter | Clinical | Prod | CMT | pH | Cl | Cells/ml(10³) | | | Isolate Identification/ML |
|---|---|---|---|---|---|---|---|---|---|
| | | | | | | Pol | Mon | Tot | |
| RF | Fibrosis (localised) | (lb) | 3+ | 6.80 | 117.15 | 2000 | 400 | 2400 | Staph. aureus/300 |
| RH | Normal | 28 | — | 6.60 | 74.80 | 50 | 150 | 200 | No growth |
| LF | Fibrosis (dry) | | — | 6.70 | 102.95 | 50 | 200 | 250 | No growth |
| LH | Normal | | — | 6.60 | 71.00 | 100 | 200 | 300 | No growth |

TABLE IV(b)

14 days after second treatment of all four quarters with Immuno Globulin plus 0.25% Phenol, 200,000 I.U. Penicillin G and 250 mg Dihydrostreptomycin per dose.

| Quarter | Clinical | Prod | CMT | pH | Cl | Cells/ml(10³) | | | Isolate Identification/ML |
|---|---|---|---|---|---|---|---|---|---|
| | | | | | | Pol | Mon | Tot | |
| RF | Fibrosis (normal) | (lb) | — | 6.70 | 92.80 | 100 | 100 | 200 | No growth |
| RH | Normal | 36 | — | 6.65 | 78.10 | 0 | 150 | 150 | No growth |
| LF | Fibrosis (Normal) | | — | 6.70 | 88.40 | 0 | 200 | 200 | No growth |
| LH | Normal | | — | 6.60 | 71.00 | 0 | 50 | 50 | No growth |

TABLE V

Before Treatment

| Quarter | Clinical | Prod | CMT | pH | Cl | Cells/ml(10³) Pol | Cells/ml(10³) Mon | Cells/ml(10³) Tot | Isolate Identification/ml |
|---|---|---|---|---|---|---|---|---|---|
| RF | Acute oedematous mastitis in all 4 quarters. Painful, walking difficult. No feeding. | (lb) 6 | 4+ | 6.85 | 142.60 | | | Uncountable | 1.Staph. aureus/ 2400. 2.Strept. agalactiae/2 |
| RH | | | 4+ | 6.80 | 127.30 | | | Uncountable | 1.Strept. agalactiae/ 800. 2.Staph. epidermidis/ 200 |
| LF | | | 4+ | 6.80 | 124.80 | | | Uncountable | Staph. epidermidis/800 |
| LH | | | 4+ | 6.70 | 113.60 | | | Uncountable | 1.Staph. epidermidis/ 1000. 2.Staph. aureus/ 1000 |

TABLE V(a)

60 Hours after treatment of all 4 quarters with Immuno-Globulin plus Phenol 0.25% dose 50 ml per quarter

| Quarter | Clinical | Prod | CMT | pH | Cl | Cells/ml(10³) Pol | Cells/ml(10³) Mon | Cells/ml(10³) Tot | Isolate Identification/ml |
|---|---|---|---|---|---|---|---|---|---|
| RF | Normal size Hard (Intersticial oedema) | (lb) 17 | 4+ | 6.85 | 142.00 | — | — | 1800 | Staph. aureus/ 430 |
| RH | | | 4+ | 6.80 | 124.95 | — | — | 2100 | No growth |
| LF | | | 4+ | 6.70 | 117.30 | — | — | 1200 | No growth |
| LH | | | 4+ | 6.70 | 110.75 | — | — | 900 | No growth |

TABLE V(b)

8 Days after one treatment with Immuno-Globulin

| Quarter | Clinical | Prod | CMT | pH | Cl | Cells/ml(10³) Pol | Cells/ml(10³) Mon | Cells/ml(10³) Tot | Isolate Identification/ml |
|---|---|---|---|---|---|---|---|---|---|
| RF | Minute Fibrosis | (lb) 28 | 4+ | 6.85 | 124.15 | 1000 | 0 | 1000 | 1.B-haemolytic staph. aureus/ 800. 2.Staph. epidermidis/2 |
| RH | '' | | 2+ | 6.75 | 117.30 | 600 | 300 | 900 | B-haemolytic staph. aureus |
| LF | '' | | + | 6.70 | 102.80 | 500 | 500 | 1000 | B-haemolytic staph. aureus |
| LH | '' | | + | 6.70 | 99.40 | 300 | 600 | 900 | '' |

TABLE V(c)

22 Days after first treatment with immuno-globulin (alone) and 14 days after second treatment with immuno-globulin plus 0.25% Phenol, 200,000 I.U. Penicillin G and 250 mg Dihydrostreptomycin per dose.

| Quarter | Clinical | Prod | CMT | pH | Cl | Cells/ml(10³) | | | Isolate Identification/ml |
|---|---|---|---|---|---|---|---|---|---|
| | | | | | | Pol | Mon | Tot | |
| RF | Minute Fibrosis | (lb) | — | 6.65 | 95.85 | 200 | 100 | 300 | No growth |
| RH | " | 34 | — | 6.60 | 71.00 | 0 | 100 | 100 | No growth |
| LF | " | | — | 6.65 | 84.50 | 200 | 200 | 400 | No growth |
| LH | " | | — | 6.60 | 78.10 | 50 | 50 | 100 | No growth |

TABLE VI

Before Treatment

| Quarter | Clinical | Prod | CMT | pH | Cl | Cells/ml(10³) | | | Isolate Identification/ml |
|---|---|---|---|---|---|---|---|---|---|
| | | | | | | Pol | Mon | Tot | |
| RF | Chronic Fibrosis | (lb) | 3+ | 6.75 | 106.50 | Uncountable | | | 1.Staph. aureus/α  2.Staph. epidermidis/α |
| RH | " | 16 | 3+ | 6.70 | 102.95 | Uncountable | | | 1.Staph. epidermidis/α  2.Strept. agalactiae/α |
| LF | " | | 3+ | 6.80 | 131.35 | 1500 | 1000 | 2500 | Strept. agalactiae/α |
| LH | Distinct Fibrosis | | 3+ | 6.85 | 134.90 | Uncountable | | | " |

TABLE VI(a)

14 days after 2nd treatment

| Quarter | Clinical | Prod | CMT | pH | Cl | Cells/ml(10³) | | | Isolate Identification/ml |
|---|---|---|---|---|---|---|---|---|---|
| | | | | | | Pol | Mon | Tot | |
| RF | Fibrosis (smaller) | (lb) | — | 6.70 | 88.75 | 150 | 100 | 250 | Staph. aureus/40 |
| RH | " | 20 | 2+ | 6.80 | 110.05 | 1200 | 1400 | 2600 | Staph. aureus/80 (a+B-haemolytic |
| LF | " | | + | 6.80 | 113.60 | 250 | 100 | 350 | No growth |
| LH | " | | 4+ | 7.00 | 138.45 | — | | 4200 | Staph. aureus/4000 |

TABLE VI(b)

21 days after 3rd Treatment

| Quarter | Clinical | Prod | CMT | pH | Cl | Cells/ml(10³) | | | Isolate Identification/ml |
|---|---|---|---|---|---|---|---|---|---|
| | | | | | | Pol | Mon | Tot | |
| RF | Fibrosis (small) | (lb) | — | 6.70 | 92.30 | 0 | 100 | 100 | No growth |
| RH | " | 22 | — | 6.70 | 102.95 | 150 | 150 | 300 | " |
| LF | " | | — | 6.70 | 99.40 | 0 | 200 | 200 | " |
| LH | " | | — | 6.75 | 110.05 | 250 | 250 | 500 | Staph. epidermidis/220 |

TABLE VII

Chronic Mastitis — Before Treatment

| Quarter | Clinical | Prod | CMT | pH | Cl | Cells/ml(10³) | | | Isolate Identification/ml |
|---|---|---|---|---|---|---|---|---|---|
| | | | | | | Pol | Mon | Tot | |
| RF | Fibrosis with Interstical Oedema (hard) | (lb) | | | | | | | Staph. aureus/ 2050 |
| | | | 3+ | 6.75 | 117.15 | 2000 | 1500 | 3500 | |
| RH | " | 23 | 3+ | 6.70 | 127.80 | 950 | 800 | 1750 | Staph. aureus/ 5000. ditto 273 |
| LF | Normal | | — | 6.60 | 95.85 | 100 | 0 | 100 | Staph. epidermidis/50 |
| LH | Normal | | — | 6.60 | 78.10 | 0 | 50 | 50 | No growth |

TABLE VII(a)

3 Days after treatment of Rf, RH, LF with Ig No. 13 dose 50 ml per quarter

| Quarter | Clinical | Prod | CMT | pH | Cl | Cells/ml (10³) | | | Isolate: Identification/ml |
|---|---|---|---|---|---|---|---|---|---|
| | | | | | | Pol | Mon | Tot | |
| RF | Dispersed fibrosis (no oedema) | (lb) | | | | | | | |
| | | | 4+ | 6.80 | 117.15 | — | — | 2800 | No growth |
| RH | " | 30 | 4+ | 6.70 | 102.95 | — | — | 3300 | " |
| LF | Normal | | 4+ | 6.70 | 113.60 | — | — | 1200 | " |
| LH | Normal | | — | 6.65 | 81.65 | 100 | 150 | 250 | " |

TABLE VII(b)

6 Days after Treatment

| Quarter | Clinical | Prod | CMT | pH | Cl | Cells/ml (10³) | | | Isolate Identification/ml |
|---|---|---|---|---|---|---|---|---|---|
| | | | | | | Pol | Mon | Tot | |
| RF | Fibrosis (dry) | (lb) | 2+ | 6.70 | 106.50 | 1950 | 100 | 2950 | No growth |
| RH | " | 29 | 2+ | 6.65 | 92.30 | 350 | 300 | 650 | " |
| LF | Normal | | — | 6.60 | 92.30 | 200 | 100 | 300 | " |
| LH | " | | — | 6.60 | 78.10 | 50 | 50 | 100 | " |

TABLE VII(c)

16 Days after Treatment

| Quarter | Clinical | Prod | CMT | pH | Cl | Cells/ml (10³) | | | Isolate Identification/ml |
|---|---|---|---|---|---|---|---|---|---|
| | | | | | | Pol | Mon | Tot | |
| RF | Localised Fibrosis | (lb) | — | 6.65 | 88.50 | 0 | 200 | 200 | No growth |
| RH | " | 27 | — | 6.60 | 88.50 | 200 | 50 | 250 | No growth |
| LF | Normal | | — | 6.60 | 78.10 | 0 | 0 | 0 | No growth |
| LH | Normal | | — | 6.60 | 74.55 | 50 | 150 | 150 | No growth |

TABLE VIII

Before Treatment.

| Quarter | Clinical | Prod | CMT | pH | Cl | Cells/ml($10^3$) Pol | Cells/ml($10^3$) Mon | Cells/ml($10^3$) Tot | Isolate Identification/ml |
|---|---|---|---|---|---|---|---|---|---|
| RF | Hardening fibrosis | (lb) | 4+ | 6.95 | 134.90 | 2000 | — | 2000 | Strept. agalactiae/3200 |
| RH | Normal (Minute fibrosis) | 14 | 4+ | 6.90 | 142.05 | 1200 | 800 | 2000 | 1.Strept. agalactiae/1100 2.Staph. aureus (Gr. alpha-haemol)/200 |
| LF | Fibrosis Atrophy | | 2+ | 6.75 | 85.10 | 900 | 600 | 1500 | Staph. aureus (Cl.alpha-haemol)/130 |
| LH | Hardening Fibrosis | | 4+ | 6.85 | 134.90 | 1800 | 600 | 2400 | 1.Strept. agalactiael 1800 2.Staph. aureus(gr. alpha-haemol)/70 3.Staph. aureus(Cl. alpha-haemolytic)/50 |

TABLE VIII(a)

60 Hours after 2nd treatment of RF and RH with Ig 17/18, dose 25 ml and 72 hours after treatment of LF and LH with Immuno Globulin (25 ml Ig 17/18, 200,000 I.U. Penicillin G and 250 mg Dihydrostreptomycin

| Quarter | Clinical | Prod | CMT | pH | Cl | Cells/ml($10^3$) Pol | Cells/ml($10^3$) Mon | Cells/ml($10^3$) Tot | Isolate Identification/ml |
|---|---|---|---|---|---|---|---|---|---|
| RF | Fibrosis | (lb) | 4+ | 6.80 | 128.40 | 1000 | 400 | 1400 | No growth |
| RH | Minute Fibrosis | 16 | 4+ | 6.80 | 113.60 | 800 | 200 | 1000 | Staph. aureus (B.haemolytic) 60 |
| LF | Fibrosis + Atrophy | | 4+ | 6.70 | 102.80 | 1200 | 800 | 2000 | No growth |
| LH | Hardening | | 4+ | 6.70 | 134.90 | 800 | 400 | 1200 | No growth |

TABLE VIII(b)

15 Days after last treatment

| Quarter | Clinical | Prod | CMT | pH | Cl | Cells/ml($10^3$) Pol | Cells/ml($10^3$) Mon | Cells/ml($10^3$) Tot | Isolate identification/ml |
|---|---|---|---|---|---|---|---|---|---|
| RF | Fibrosis (dry) | (lb) | ± | 6.70 | 78.10 | 200 | 200 | 400 | Staph. epidermidis/20 |
| RH | Normal | 25 | — | 6.70 | 85.10 | 50 | 150 | 200 | B.Haemolytic Staph aureus |
| LF | Atrophy + Fibrosis (dry) | | — | 6.70 | 81.65 | 150 | 150 | 300 | No growth |
| LH | Fibrosis (dry) | | — | 6.70 | 88.75 | 50 | 300 | 350 | No growth |

TABLE VIII(c)

30 days after last treatment

| Quarter | Clinical | Prod | CMT | pH | Cl | Cells/ml($10^3$) Pol | Cells/ml($10^3$) Mon | Cells/ml($10^3$) Tot | Isolate Identification/ml |
|---|---|---|---|---|---|---|---|---|---|
| RF | Normal (fibrosis dry) | (lb) | — | 6.60 | 78.10 | 0 | 100 | 100 | No growth |
| RH | Normal | 32 | — | 6.65 | 78.10 | 50 | 200 | 250 | No growth |
| LF | Normal (Atrophy) | | — | 6.65 | 88.70 | 0 | 150 | 150 | No growth |
| LH | Normal (Fibrosis dry) | | — | 6.68 | 92.30 | 100 | 100 | 200 | No growth |

TABLE IX

Chronic Mastitis — Before Treatment

| Quarter | Clinical | Prod | CMT | PH | Cl | Cells/ml($10^3$) | | | Isolate Identification/ml |
|---|---|---|---|---|---|---|---|---|---|
| | | | | | | Pol | Mon | Tot | |
| RF | Fibrosis (oedema) (lumps in milk) | (lb) | 4+ | 6.75 | 124.50 | 850 | 250 | 1100 | Staph. aureus/ 990 |
| RH | Normal | 30 | — | 6.65 | 81.65 | 100 | 250 | 350 | No growth |
| LF | " | | — | 6.625 | 74.55 | 0 | 50 | 50 | No growth |
| LH | " | | — | 6.625 | 71.00 | 100 | 0 | 100 | No growth |

TABLE IX(a)

3 Days after one treatment with IG 18, dose 25 ml of RF. Second treatment of RF with Ig 18, 25 ml

| Quarter | Clinical | Prod | CMT | pH | Cl | Cells/ml($10^3$) | | | Isolate Identification/ml |
|---|---|---|---|---|---|---|---|---|---|
| | | | | | | Pol | Mon | Tot | |
| RF | Fibrosis (clean milk) | (lb) | 4+ | 6.70 | 113.60 | 650 | 500 | 1150 | Staph. aureus/340 |
| RH | Normal | 28 | — | 6.60 | 74.55 | 50 | 100 | 150 | No growth |
| LF | " | | — | 6.65 | 67.45 | 0 | 150 | 150 | No growth |
| LH | " | | — | 6.60 | 78.10 | 50 | 100 | 150 | No growth |

TABLE IX(b)

14 Days after treatment of RF with Ig 18, 25 ml

| Quarter | Clinical | Prod | CMT | pH | Cl | Cells/ml($10^3$) | | | Isolate Identification/ml |
|---|---|---|---|---|---|---|---|---|---|
| | | | | | | Pol | Mon | Tot | |
| RF | Fibrosis (dry) | (lb) | — | 6.70 | 92.80 | 100 | 200 | 300 | No growth |
| RH | Normal | 33 | — | 6.65 | 88.10 | 0 | 100 | 100 | No growth |
| LF | " | | — | 6.65 | 81.20 | 50 | 50 | 100 | No growth |
| 1h | " | | — | 6.60 | 78.10 | 0 | 200 | 200 | No growth |

TABLE X

Treatment of an artificially caused mastitis. See immunity against mastitis. Before treatment and 14 days after exposure of RF

| Quarter | Clinical | Prod | CMT | pH | Cl | Cells/ml($10^3$) | | | Isolate Identification/ml |
|---|---|---|---|---|---|---|---|---|---|
| | | | | | | Pol | Mon | Tot | |
| RF | Acute painful oedematic mastitis; very hard, less milk, wet jelly. | (lb) | — | 6.95 | 142.0 | Uncountable | | | Pseudomonas |
| RH | Enlarged and oedematic Clinically | 8 | — | 6.80 | 138 | Uncountable | | | Pseudomonas |
| LF | Normal | | — | 6.75 | 117 | — | — | 1100 | Staph. aureus Strept. non-agalactiae |
| LH | Normal | | + | 6.70 | 113 | 250 | 400 | 650 | Staph. aureus Staph. epidermidis |

TABLE X(a)

16 days after exposure of RF (Pseudomonas) and LF (Staph. aureus) and 12 hours after first treatment of RF and RH with Ig 17/20, dose 25 ml per quarter

| Quarter | Clinical | CMT | pH | Cl | Cells/ml($10^3$) | | | Isolate Identification/ml |
|---|---|---|---|---|---|---|---|---|
| | | | | | Pol | Mon | Tot | |
| RF | Improvement; acute mastitis interstitial oedema; lumps | — | 6.80 | Too little milk | | | | No growth |
| RH | Larger than LF and LH, milk normal | — | 6.70 | 88.75 | Uncountable | | | No growth |
| LF | Normal | — | 6.70 | 74.55 | Uncountable | | | Staph. aureus 330 Strept. agalactiae |
| LH | Normal | — | 6.55 | 67.45 | 100 | 250 | 350 | 1.Staph aureus (large homolysis)390 2.Staph. aureus(B) 3.Staph. epidermidis |

TABLE X(b)

4 days after 1st treatment of RF and RH; 2 days after 2nd treatment of RF and RH and 1st treatment of LF and LH with Ig 17/20. Dose per treatment 25 ml/quarter

| Quarter | Clinical | Prod | CMT | pH | Cl | Cells/ml($10^3$) | | | Isolate Identification/ml |
|---|---|---|---|---|---|---|---|---|---|
| | | | | | | Pol | Mon | Tot | |
| RF | Slight oedema (fibrosis (± 80% normal) | (lb) | + | 7.0 | 138 | Uncountable | | | No growth |
| RH | Slight oedema | 17 | + | 6.80 | 124 | 4000 | — | 4000 | No growth |
| LF | Normal | | + | 6.75 | 124 | 1200 | 200 | 1400 | No growth |
| LH | Normal | | + | 6.70 | 113 | 800 | 400 | 1200 | No growth |

TABLE X(c)

17 days after last treatment of all four quarters.

| Quarter | Clinical | Prod | CMT | pH | cl | Cells/ml($10^3$) | | | Isolate Identification/ml |
|---|---|---|---|---|---|---|---|---|---|
| | | | | | | Pol | Mon | Tot | |
| RF | Normal | (lb) | — | 6.70 | 113.60 | 50 | 150 | 200 | No growth |
| RH | Normal | 28 | — | 6.70 | 113.60 | 100 | 100 | 200 | No growth |
| LF | Normal | | — | 6.70 | 106.50 | 0 | 100 | 100 | Staph. epidermidis/40 |
| LH | Normal | | — | 6.70 | 102.40 | 0 | 50 | 50 | No growth |

While the action of the antibody is not completely understood at this stage it is believed that the action is due to immobilisation and growth inhibition of macroorganisms in conjunction with increased phagocytosis.

The Applicant has conducted extensive experiments which have shown that healthy cows treated with the antibody have shown only mild irritation which has disappeared completely after 3 to 5 days.

EXAMPLE 5

Any other suitable antibiotic substance can be used instead of, or in addition to, those specified in Example 2.

Generally there is an in vivo efficiency index of about 40 percent with Penicillin G, about 50 percent with semi-synthetic penicillins or a Penicillin G + streptomycin combination, about 70 percent with F Furazolidone, an Erythromycin and Noviobiocin combination or a Neomycin and Bocitracin combination, and about 90 percent with Chloramphenicol.

In an experiment on a ewe of German Merino breed immuno-globulin obtained from the pooled blood of slaughtered cows was used.

The ewe was suffering from mastitis or "blue udder," the udder being hard, swollen and sensitive.

A single dose of 2 ml was administered per quarter and once only.

In 2 days the udder of the ewe had returned to normal.

This experiment was repeated with the same satisfactory results being obtained.

Similar experiments were also conducted on goat does where once again the same curing of the mastitis disease was obtained.

No detailed tables have been set out for these experiments as only single treatments and at reduced dosage compared with that for cows were required. It will be appreciated that the immuno-globulin for treatment of sheep and goats may be obtained from these animals themselves and it is not essential that the blood of cows be used for this purpose and the disclosure in the specification and claims is to be read in the light of this fact. Thus where applicable the term "cow" will be understood to include or be substituted by the words "ewe" or "doe" as the case may be.

I claim:

1. A composition for the treatment of bovine mastitis comprising an effective amount of immuno-globulin obtained from blood pooled from cows suffering from mastitis in admixture with a pharmaceutically acceptable diluent.

2. The composition of claim 1, further containing antibiotics.

3. The product as claimed in claim 1 in which the product is in freeze dried form.

4. The product as claimed in claim 1 includes a preservative.

5. A method of treating bovine mastitis in cows suffering therefrom which comprises an intra-mammary introduction to said cows of an effective amount of immuno-globulin obtained from blood pooled from cows suffering from mastitis.

6. A method as claimed in claim 5 in which the introduction is effected either by infusion or injection.

7. The method of claim 5, further containing antibiotics.

8. A method as claimed in claim 5 in which the immuno-globulin is mixed with a diluent.

9. A method as claimed in claim 8 in which the diluent includes a preservative.

10. A method of inducing passive immunity against bovine mastitis in cows which comprises the intra-mammary introduction of an effective amount of immuno-globulin obtained from blood pooled from cows suffering from mastitis.

* * * * *